United States Patent Office 3,536,405
Patented Oct. 27, 1970

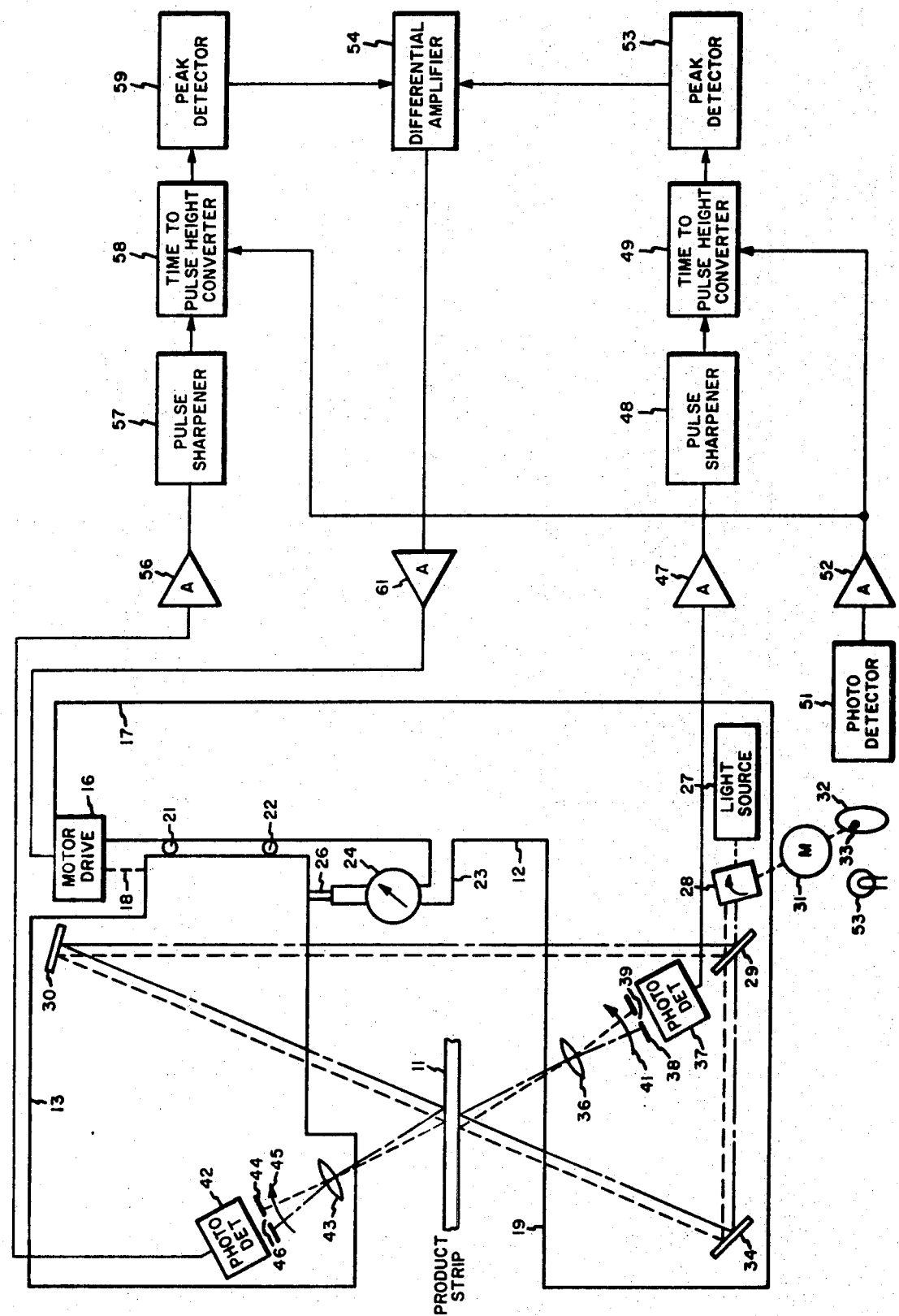

3,536,405
OPTICAL THICKNESS GAUGE
Robert A. Flower, White Plains, N.Y., assignor to Singer-General Precision, Inc., a corporation of Delaware
Filed June 12, 1968, Ser. No. 736,480
Int. Cl. G01b 11/06; G01n 21/22
U.S. Cl. 356—167          7 Claims

ABSTRACT OF THE DISCLOSURE

A specimen whose thickness is to be measured is mounted between a fixed member and a member movable with respect thereto. A light source mounted on the fixed member projects a light beam through a rotating prism onto a reflecting mirror from which it is reflected onto a surface of the specimen and from thence to an optical system, diaphragm slit to a photodetector producing an output pulse each time the beam is scanned across the diaphragm slit. A light splitter mounted on the fixed member projects a portion of the light beam onto a mirror mounted on the movable member. The second mirror reflects the light beam onto the other surface of the specimen from which it is reflected through an optical system and diaphragm slit onto a second photodetector which produces a second output each time the second beam portion is scanned across the second diaphragm slit. The times of occurrence of the output pulses are converted to pulses whose amplitudes are proportional to their times of occurrence and through a servo system the relative amplitudes are used to position the movable member relative to the fixed member. A dial gauge mounted on the fixed member has a plunger engaging the movable member to indicate their related displacement and therefore the thickness of the specimen.

DESCRIPTION OF THE INVENTION

The instant invention relates to an arrangement for measuring the thickness of a specimen or moving strip by optical means so that no physical contact is made therewith. To this end light beams are scanned across opposite surfaces of the specimen and the reflected beams are converted to electrical pulses whose relative times of ocurrence are a measure of the thickness of the specimen. The relative time phases of these electrical pulses are then utilized to provide an indication of the specimen thickness.

An object of the invention is to provide an arrangement for determining the thickness of a specimen without physical contact therewith.

A further object of the invention is to provide a non-contact thickness gauge which is not adversely affected by the relative position of the specimen in space.

A further understanding of the invention will be had from the detailed description and the drawings in which:

The single figure of the drawing illustrates a preferred embodiment of the invention partially in block and partially in mchanical form.

Referring now to the single figure of the drawing, a specimen piece 11 whose thickness is to be determined is positioned in any desired manner between a fixed member 12 and a movable member 13. In many applications the specimen piece 11 may be a continuously moving strip moving in a direction normal to the drawing and its thickness may be constantly monitored by the device of the invention.

A motor drive 16 affixed to the extension 17 of the fixed member 12 is mechanically coupled to the movable member 13 by a lead screw or the like as represented by the dotted line drive 18 so that the movable member 13 may be driven by the motor 16 in a direction toward or away from the jaw 19 of the fixed member 12. This movement is facilitated by bearings 21 and 22 mounted in suitable carriage ways on the fixed and movable members.

Also affixed to the fixed member 12 is a bracket 23 on which is mounted a dial indicator 24 the plunger 26 of which engages the movable member 13 so that the relative linear displacement therebetween is indicated Alternatively, an air gage or similar device connected to a recorder may be substituted for the dial indicator so that a continuous record of the relative displacement between the fixed and movable members may be obtained.

A light source 27 projects a beam of light through a revolving prism 28 toward a beam splitter 29 which divides the light beam into two separate light paths. The prism 28 is revolved in a clockwise direction by a motor 31 which through suitable gearing also rotates a disc 32 provided with a small aperture 33 for purposes as will be described hereinafter.

Since the prism 28 is rotated in a clockwise direction the light beam as it leaves the prism is rotated in the same direction and in the illustration of the drawing the light beam rays at the beginning of the scan area of importance are represented by the dash-dot lines whereas the termination of the rear rays as far as it is essential therein are represented by the dashed lines.

The first light beam path after leaving the prism 28 is projected through the beam splitter 29 onto a mirror 34 mounted on the fixed member 12 from which it is reflected to the under surface of the specimen or product strip 11. This beam is further reflected from this undersurface through a lens system to a photodetector 37. Immediately in front of the protodetector 37 a diaphragm 38 having a slit 39 is positioned so that as the light rays are scanned across the slit a short electrical pulse is generated by the photodetector 37. As will be seen by the geometry of the rays depicted the light beam is scanned across the light slit 39 in a counterclockwise direction as indicated by the arrow 41.

The second light path derived from the light source 27 and the revolving prism 28 comprises the light beams reflected from the beam splitter 29 onto a mirror 30 fixedly mounted on the movable member 13. The light rays reflected from the mirror 30 are directed toward the upper surface of the specimen on product strip 11 and are in turn reflected by this upper surface onto a photodetector 42 through a lens system 43. As in the case of the photodetector 37 a diaphragm 44 having a slit 46 is mounted immediately in front of the photodetector 42 so that as the light beam scans across the slit an electrical pulse is generated by the photodetector 42. Again, as will be seen by the geometry of the light rays as depicted in the drawing, the light rays reflected by the upper surface of the strip 11 are scanned across the light slit 46 in a clockwise direction, as indicated by the arrow 45.

The pulse generated by the photodetector 37 as a result of the light rays scanning across the slit 39 is impressed on an amplifier 47 the output of which is sharpened by the pulse sharpener 48 and the sharpened pulse impressed as an input on the time to pulse height converter 49. This circuit component may be of the type produced by General Applied Science Laboratories, Inc., known as type N-134. Such a device operates to produce an output pulse whose amplitude is directly proportional to the time interval occurring between the application of a reference pulse input and a later occurring pulse input.

In the present instance the reference pulse input is derived from the output of a photodetector 51 amplified by an amplifier 52. The input of the photodetector 51 is derived from a light source 53 the light from which is projected through the aperture 33 of the disc 32 as it is rotated by the motor 31 through suitable gearing (not shown) so that the photodetector 51 produces a pulse output synchronously timed with the rotation of the scanning prism 28. Thus the occurrence of the reference pulse produced by the photodetector 51 may bear an invariant time relation to the scanning of the light beams on the product strip 11 and the amplitude of the output pulse of the time to pulse height converter is directly proportional to the time that the beam reflected from the underside of the product strip is scanned across the slit 39. This amplitude pulse is then peak detected by the peak detector 53 and its output constitutes an input of the differential amplifier 54.

The output of the photodetector 42 is impressed on a path similar to that just described consisting of an amplifier 56, pulse sharpener 57, and time to pulse height converter 58. The other input of the time to pulse height converter 58 is derived from the output of the photodetector 51 so that as in the case of the output of the time to pulse height converter 49 the output of the converter 58 is a pulse whose amplitude is proportional to the instant of time that the light beam is scanned across the slit 46. The output of the converter 58 is impressed on the input of a peak detector 59 and its output in turn constitutes the other input of the differential amplifier 54. Thus the output of the differential amplifier 54 is of one sense or the opposite sense depending on whether the output of the peak detector 53 preponderates over that of peak detector 59 or vice versa. The output of the differential amplifier 54 is amplified by amplifier 61 and this amplified signal constitutes the driving power for the motor 16 which in turn drives the movable member 13 toward or away from the fixed member 12 until the output of the differential amplifier 54 is at a null.

In considering the operation of the device, let it be assumed that a specimen piece of known thickness is inserted as the product strip, then through the operation of the servo loop system above described, the motor 16 will drive the member 13 toward or away from the fixed member 12 until such a position is reached that the light beam reflected from the underside of the specimen is scanned across the slit 39 at exactly the same instant of time that the light beam reflected from the upper side of the specimen is scanned across the slit 46. The dial indicator 24 or recording instrument, if one is used, may be then set to this known thickness and the device thus calibrated.

If now a strip whose thickness is to be measured is inserted, and let it be assumed that it is thicker than the standard specimen, it will be apparent from the geometry of the drawing that the moving point of intersection of the light beam with the upper surface of the strip will be shifted to the right and thus after imaging by the lens 43 on diaphragm 44 will be scanned across the slit 46 at an instant of time which is earlier than the instant of time during which the light beam reflected from the undersurface of the strip is scanned across the slit 39. The inputs to the differential amplifier 54 will be unbalanced in amplitude and an output will be produced which acting through the amplifier 61 will apply power to the motor 16 driving the member 13 and the mirror 30 away from the member 12 and the beam splitter 29 carried thereby. This moves the elemental area spot in the strip from which light is reflected through the slit 46 to the left so that the slit 46 is scanned at a later time instant coinciding with the time instant that the slit 39 is scanned striking a new balanced input to the differential detector 54 and hence producing a null output. The movement which is indicated by the gage 24 thereby indicates the new thickness dimension.

It will be apparent to those skilled in the art that the particular location of the product strip as respects the movable and fixed member 13–12, is not important because the thickness is determined by the relative times that a light beam is reflected from elemental areas on opposite sides of the strip. That is, if the upper surface of 11 moves up, as mentioned above, the pulse output of detector 42 occurs at a relatively earlier time in each scan cycle. Likewise, if the lower surface moves up by an equal amount, the pulse output of detector 37 also occurs at an equal earlier relative time. Thus the thickness of a moving strip may be constantly monitored even though some flutter is encountered as it passes the point of measurement.

What is claimed is:

1. An optical thickness gage comprising,
    means for scanning an elemental area on one surface of a member whose thickness is being measured with a first beam of incident radiation,
    means for scanning an elemental area on the opposite surface of said member with a second beam of incident light radiation,
    means responsive to the radiation reflected from said elemental area on said one surface for generating a first pulse signal,
    means responsive to the radiation reflected from said elemental area on said opposite surface for generating a second pulse signal,
    comparison means responsive to each of said first and second pulse signals for producing an output signal representing relative time between occurrence of said first and second pulse signals, and
    means responsive to said comparison means output signal for indicating the thickness of said member, wherein the improvement comprises:
    a pair of relatively adjustable support members, said member whose thickness is being measured being positioned therebetween,
    said means for generating said first pulse signal being mounted on one of said support members,
    said means for generating said second pulse signal being mounted on the other of said support members, and wherein
    said indicator means includes means responsive to said comparison means output signal for adjusting the relative displacement between said pair of support members until said comparison output signal is nulled.

2. The improvement of claim 1 wherein said indicator means further includes means mounted on one of said support members and engaging the other of said support members to indicate the relative positional displacement therebetween.

3. The improved optical thickness gage as set forth in claim 1 in which said first support member is maintained in fixed position, and
    said second support member is longitudinally movable with respect to said first support member and said member whose thickness is to be measured.

4. The improved optical thickness gage as set forth in claim 1 in which,
    said comparison means includes means for generating a difference signal whose sense and amplitude is proportional to the relative times of occurrence of said first and second pulse signals, and
    said indicator means includes servo mechanism means responsive to said difference signal and operatively connected to one of said support members for varying its positional displacement with respect to the other of said support members in accordance with the sense and amplitude of said difference signal.

5. An optical thickness gage comprising,
    a first support member positioned adjacent one side of an object whose thickness is to be measured,
    a second support member positioned adjacent the opposite side of said object,
    a first mirror carried by said first support member,
    a light source projecting a beam of light onto said mirror from which it is reflected to one side of said object,
    a second mirror carried by said second support member,
    beam splitter means interposed in the beam of light from said light source for projecting a beam of light onto said second mirror from which it is reflected to the other side of said object, light scanning means interposed between said light source and said beam splitter means whereby the beams of light reflected on opposite sides of said object from said first and second mirror are scanned over areas on opposite surfaces of said object, a first photodetector mounted on said first support member positioned to receive the light reflected from said one side of said object, means interposed between said one side of said object and said first photodetector for restricting the light received thereby to that reflected from an elemental area of said object, said first photodetector producing a first pulse signal at the time the light beam is scanned over said elemental area, a second photodetector mounted on said second support member positioned to receive the light reflected from said other side of said object, means interposed between said other side of said object and said second photodetector for restricting the light received thereby to that reflected from an elemental area on the other side of said object, said second photodetector producing a second pulse signal at the time the light beam is scanned over said second mentioned elemental area, comparison means having said first and second pulse signals impressed thereon and producing a comparison signal therefrom whose sense and amplitude is proportional to the relative times of occurrence of said first and second pulse signals, means operated by said comparison signal for longitudinally diplacing said first and second support member relative to each other, and means for indicating said relative displacement.

6. An optical thickness gage as set forth in claim 5 in which a motor mounted on one of said support members has said comparison signal impressed thereon,
said motor driving the other of said support members to provide relative displacement therebetween.

7. An optical thickness gage as set forth in claim 6 in which said comparison means includes,
a first time to pulse height converter having the output of said first photodetector impressed thereon,
a first peak detector connected to the output of said first time to pulse height converter,
a second time to pulse height converter having the output of said second photodetector impressed thereon,
a second peak detector connected to the output of said second time to pulse height converter,
a differential amplifier having the output of said first and second peak detector impressed on the input thereof and having its output connected to drive said motor.

References Cited

UNITED STATES PATENTS

| | | | |
|---|---|---|---|
| 2,998,745 | 9/1961 | McClellan | 365—161 |
| 3,187,185 | 6/1965 | Milnes | 356—156 |

FOREIGN PATENTS

| | | |
|---|---|---|
| 619,621 | 1961 | Italy. |
| 177,634 | 1966 | U.S.S.R. |

RONALD L. WIBERT, Primary Examiner

J. ROTHENBERG, Assistant Examiner

U.S. Cl. X.R.

250—219; 356—212